Jan. 16, 1951      H. E. CAFFREY      2,538,083
TAB HOLDER FOR LICENSE PLATES
Filed March 17, 1948      2 Sheets-Sheet 1
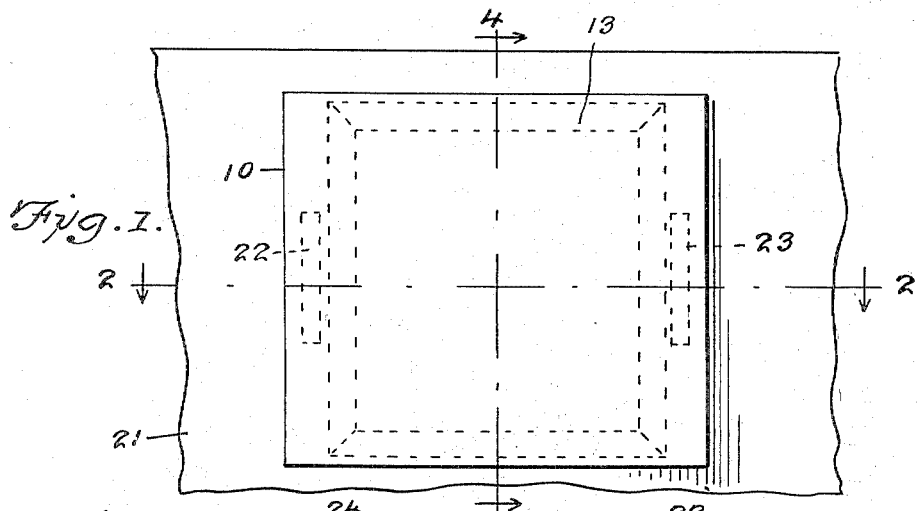
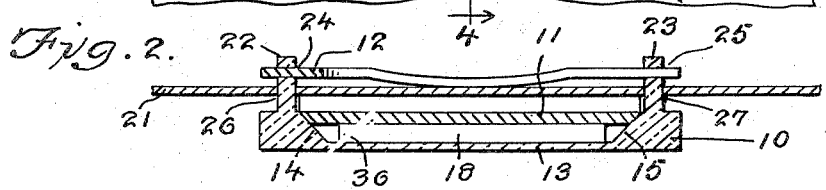
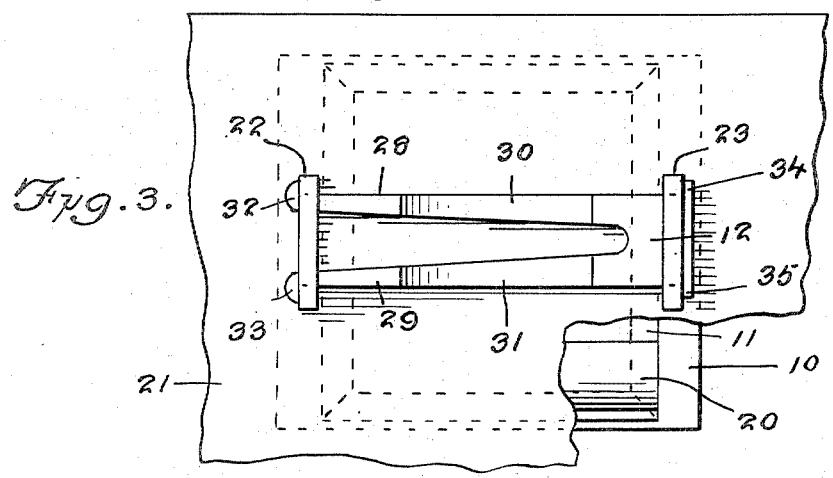
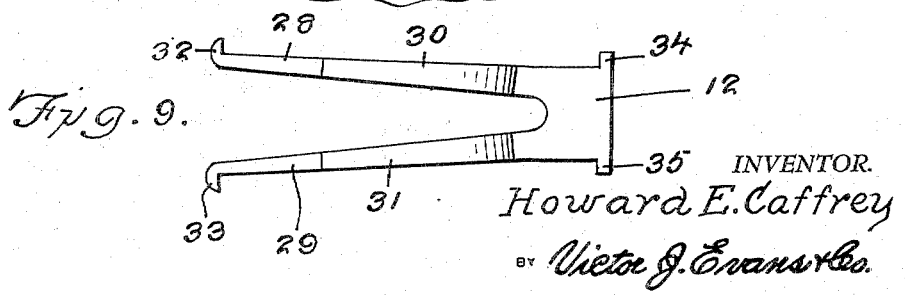
INVENTOR.
Howard E. Caffrey
BY Victor J. Evans & Co.
ATTORNEYS Jan. 16, 1951  H. E. CAFFREY  2,538,083
TAB HOLDER FOR LICENSE PLATES
Filed March 17, 1948  2 Sheets-Sheet 2
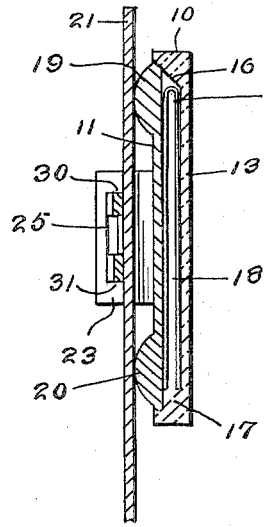
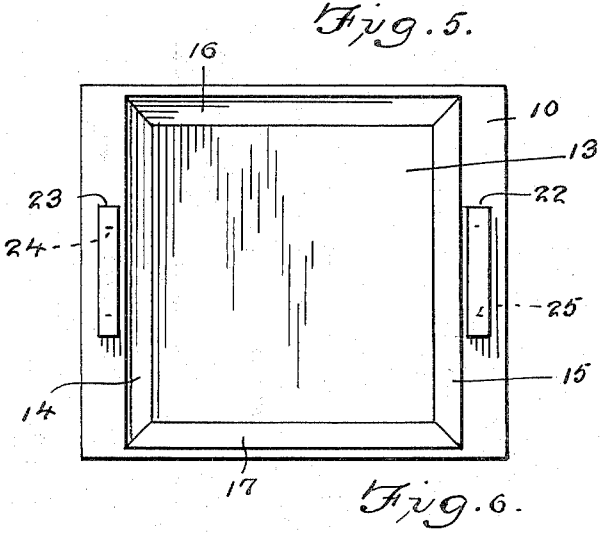
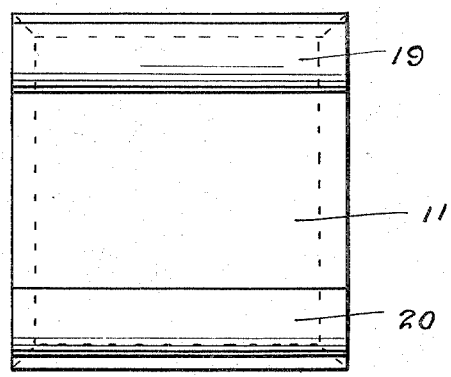
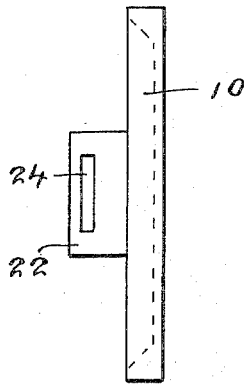
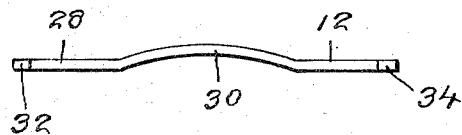
INVENTOR.
Howard E. Caffrey
BY Victor J. Evans & Co.
ATTORNEYS Patented Jan. 16, 1951

2,538,083

UNITED STATES PATENT OFFICE 2,538,083

TAB HOLDER FOR LICENSE PLATES

Howard E. Caffrey, Tucson, Ariz.

Application March 17, 1948, Serial No. 15,294

2 Claims. (Cl. 40—125)

This invention relates to license plates for motor vehicles and particularly where permanent numbering systems have been adopted so that small tabs are used for the year, and in particular the invention includes relatively small tab holding frames wherein tabs, identification cards, motor vehicle license certificates and the like may be held and protected from the elements and the frames may be attached to the license plates.

The purpose of this invention is to provide a small unique frame for tags and the like that may readily be attached to license plates so that the tags may be changed from year to year.

In many States motor vehicle license plates are used continuously from year to year and small colored tabs with the year indicated thereon are attached to the plates. These tabs are often attached by a single screw and when not accurately positioned present an untidy appearance. The screws holding the tabs corrode and rust and the license plates are sometimes damaged in changing the tabs. With these thoughts in mind this invention contemplates a neat and attractive frame having an inner tag holding compartment with a transparent face and provided with means whereby it may readily be attached to a license plate.

The object of this invention is, therefore, to provide a tag holder for license plates of motor vehicles that may readily be attached to and also readily removed from the plates.

Another object of the invention is to provide a tag holder for license plates of motor vehicles which is also adapted to hold an identification card and mailing instructions for the return of the license plate should the plate be lost.

Another object of the invention is to provide a tab holder for motor vehicle license plates that may be used with plates of any design or material.

A further object of the invention is to provide a frame for holding license plate tabs and the like which is of a simple and economical construction.

With these and other objects and advantages in view the invention consists of the new and novel combination, construction, and arrangement of parts as hereinafter more fully described, set forth in the claims appended hereto, and disclosed in the accompanying drawings, forming part hereof, wherein:

Figure 1 is a view showing a front elevation of a tab holder showing the holder attached to a license plate and with parts of the plate broken away.

Figure 2 is a sectional plan through the holder and plate taken on line 2—2 of Figure 1.

Figure 3 is a rear view of the license plate with the holder shown in dotted lines illustrating the latch for attaching the holder to the plate and showing the lower corner of the holder.

Figure 4 is a vertical section through the holder and part of a license plate taken on line 4—4 of Figure 1.

Figure 5 is a view looking toward the rear of the tab holder frame with all other parts omitted.

Figure 6 is a rear view of the panel that provides a closure for the back of the frame.

Figure 7 is a view showing an end elevation of the tab holder frame as shown in Figure 5.

Figure 8 is a plan view of the latch for securing the tab holder to a license plate.

Figure 9 is a view showing a front elevation of the latch.

Referring now to the drawings wherein like reference characters denote corresponding parts the motor vehicle license plate tab holder of this invention includes a front frame 10, a back panel 11, and a latch 12.

The frame 10 is formed of plastic or the like and the face thereof is formed with a comparatively thin panel 13 preferably of transparent material with the edges thickened to provide a reinforcing rim and with the inner edges of the ends of the rim provided with beveled surfaces 14 and 15. The inner edges of the sides of the rim are also formed with beveled surfaces 16 and 17, and the ends and sides of the panel 11 are formed with correspondingly beveled surfaces wherein with the parts assembled an inner tab holding compartment 18 will be substantially sealed. The outer surface of the panel 11 is provided with arcuate ribs 19 and 20 that bear against the outer surface of the license plate 21, as shown in Figure 4.

The rear surfaces of the ends of the rim of the frame 10 are provided with extended lugs 22 and 23 having slots 24 and 25 therein, respectively, and the lugs extend through slots 26 and 27 in the license plate while the key or latch 12 extends through the slots 24 and 25, in the lugs, as shown in Figure 2.

The latch 12 is formed with two legs 28 and 29 having arcuate sections 30 and 31 therein, respectively, and also with projections 32 and 33 at the outer ends which snap over the ends of the lug 22 while projections 34 and 35 engage the outer surface of the lug 23. With the parts assembled the arcuate sections 30 and 31 of the legs of the latch bear against the rear surface of the license plate and hold the parts in tension at all times.

With the parts arranged in this manner a tab 36 with numerals indicating the year thereon may be placed in the recess or compartment 18 and the panel 11 inserted as shown in Figure 4. The lugs on the back of the frame are then inserted through the openings in the license plate and the latch is placed through the slots in the lugs by holding the ends of the legs together. The resilient arcuate surfaces of the latch hold the parts in tension and the tab is substantially sealed in the frame.

The frame is positioned on a license plate so that the numerals indicating the year or other indicia will show through the transparent panel 13. With the frame mounted on the license plate in this manner the tab holder will remain on the plate even though the plate may drop from the vehicle and with an identification card and even stamps in the compartment 18 a finder of the plate would be inclined to drop it in the mail to return it to the owner. A card with the signature of the owner and the car license may also be included in the compartment. The beveled surfaces make the holder substantially watertight, however it will be understood that the edges may be sealed with cement or other suitable material.

It will be understood that other changes may be made in the design and arrangement of the parts without departing from the spirit of the invention.

What is claimed is:

1. A tab holder for motor vehicles having license plates with openings therethrough comprising a frame with a transparent front panel with a reinforcing rim and having a recess behind the said transparent front panel, said frame having lugs with slots therein extending from the rear surface of the rim and positioned in the openings of the license plate, a panel with projecting ribs on the rear surface positioned in the recess of the frame substantially sealing said recess, and a latch with resilient legs and having arcuate sections in the legs positioned in the slots of the lugs with the arcuate sections thereof bearing against the rear surface of the license plate urging the ribs of the sealing panel against the opposite surface of the plate.

2. In a tab holder for motor vehicle license plates having openings therethrough, the combination, which comprises, a transparent panel having a reinforcing rim with a recess within the rim and with beveled edges on the inner edge of the rim, a panel with corresponding beveled edges and having ribs on the rear surface positioned in said recess substantially sealing the recess, said rim having lugs with slots therethrough extending from the rear surface thereof and positioned to register with the openings through the license plate, and a latch having a head with outwardly disposed resilient legs with projections at the ends of the legs and having arcuate sections therein adapted to be snapped in the slots of the lugs of the frame to secure the holder in tension on a license plate.

HOWARD E. CAFFREY.

REFERENCES CITED

The following references are of record in the file of this patent:

UNITED STATES PATENTS

| Number | Name | Date |
|---|---|---|
| 463,500 | Follenius | Nov. 17, 1891 |
| 465,697 | Gray | Dec. 22, 1891 |
| 1,877,075 | Stephenson | Sept. 13, 1932 |

FOREIGN PATENTS

| Number | Country | Date |
|---|---|---|
| 48,069 | Norway | June 23, 1930 |
| 422,278 | Great Britain | Jan. 9, 1935 |
| 633,486 | Germany | Feb. 23, 1935 |